United States Patent
Horn et al.

(10) Patent No.: US 9,061,545 B2
(45) Date of Patent: Jun. 23, 2015

(54) WHEEL BEARING UNIT

(75) Inventors: Christian Horn, Bad Bocklet (DE); Robert Heuberger, Schweinfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/877,624

(22) PCT Filed: Jul. 4, 2011

(86) PCT No.: PCT/EP2011/061204
§ 371 (c)(1),
(2), (4) Date: Jun. 18, 2013

(87) PCT Pub. No.: WO2012/045490
PCT Pub. Date: Apr. 12, 2012

(65) Prior Publication Data
US 2013/0285438 A1   Oct. 31, 2013

(30) Foreign Application Priority Data
Oct. 8, 2010   (DE) .......................... 10 2010 047 932

(51) Int. Cl.
*F16C 35/04*   (2006.01)
*B60B 27/00*   (2006.01)
*B60B 27/02*   (2006.01)
*B60B 37/10*   (2006.01)
(Continued)

(52) U.S. Cl.
CPC ................ *B60B 27/001* (2013.01); *B60B 27/02* (2013.01); *B60B 37/10* (2013.01); *F16C 41/04* (2013.01); *F16C 19/548* (2013.01); *B60B 27/0073* (2013.01)

(58) Field of Classification Search
CPC ...... F16C 19/383; F16C 19/385; F16C 35/06; F16C 35/061; F16C 35/067; F16C 35/077; F16C 25/08; F16C 25/083; B60B 27/001
USPC ......... 384/563, 571, 581, 584, 585, 589, 517; 29/898.07
See application file for complete search history.

(56) References Cited

U.S. PATENT DOCUMENTS 2,128,683 A   8/1938 Slusser et al.
5,090,778 A * 2/1992 Laudszun et al. .......... 301/105.1
(Continued)

FOREIGN PATENT DOCUMENTS

DE   20023425 U1   2/2004
DE   102007042369 A1   3/2009
(Continued)

*Primary Examiner* — Phillip A Johnson
(74) *Attorney, Agent, or Firm* — Simpson & Simpson, PLLC

(57) ABSTRACT

A wheel bearing unit having a wheel hub which is mounted rotatably on a bearing journal by means of two tapered roller bearings which are spaced apart axially. The wheel bearing includes one outer ring, one inner ring and one roller crown ring which is formed from tapered rollers and a bearing cage. The tapered roller bearings are received by their outer rings on one axial stop of the wheel hub such that they are directed counter to one another, and the inner rings of the tapered roller bearings are spaced apart axially from one another by means of a sleeve wherein the wheel hub, tapered roller bearing and sleeve form a self-retaining assembly in the non-installed state of the wheel bearing unit. Both tapered roller bearings are secured axially by one securing means which is received directly on the wheel hub and covers the roller crown ring radially.

5 Claims, 3 Drawing Sheets

(51) Int. Cl.
*F16C 41/04* (2006.01)
*F16C 19/54* (2006.01)

(56) References Cited

U.S. PATENT DOCUMENTS

| | | | |
|---|---|---|---|
| 5,386,630 A * | 2/1995 | Fox | 29/898.09 |
| 5,719,454 A * | 2/1998 | Halsey et al. | 310/90 |
| 5,757,084 A | 5/1998 | Wagner | |
| 6,149,244 A | 11/2000 | Wagner | |
| 6,457,869 B1 | 10/2002 | Smith et al. | |
| 2003/0094849 A1 | 5/2003 | Joki et al. | |
| 2011/0291468 A1 * | 12/2011 | Rieger et al. | 301/105.1 |

FOREIGN PATENT DOCUMENTS

| | | |
|---|---|---|
| DE | 102007057226 | 6/2009 |
| DE | 102007057962 A1 | 6/2009 |
| DE | 102008009283 A1 | 8/2009 |
| DE | 202009014164 U1 | 3/2010 |
| DE | 102010033823 A1 | 2/2011 |
| EP | 0529252 A2 | 3/1993 |
| JP | 57051822 | 3/1982 |
| WO | 2004113098 A1 | 12/2004 |

* cited by examiner

WHEEL BEARING UNIT

CROSS-REFERENCE TO RELATED APPLICATIONS

The present application is the U.S. national stage application pursuant to 35 U.S.C. §371 of International Patent Application No. PCT/EP2011/061204, filed Jul. 4, 2011, which claims priority from German Patent Application No. 10 2010 047 932.2, filed Oct. 8, 2010, which applications are incorporated herein by reference in their entireties.

FIELD OF THE INVENTION

The invention relates to a wheel bearing unit, in particular for commercial vehicles, having a wheel hub which is mounted rotatably on a bearing journal by means of two tapered roller bearings which are spaced apart from one another axially with in each case one outer ring, one inner ring and one roller crown ring which is arranged between the former and is formed from tapered rollers and a bearing cage for them, the tapered roller bearings being received by means of their outer rings on in each case one axial stop of the wheel hub such that they are directed counter to one another, and the inner rings of the tapered roller bearings being spaced apart axially from one another by means of a sleeve.

BACKGROUND OF THE INVENTION

A wheel bearing unit of the generic type for use in a commercial vehicle is known, for example, from U.S. Pat. No. 6,149,244. Here, a wheel hub which carries a wheel is received rotatably on a bearing journal. Two tapered roller bearings which are received on the wheel hub such that they are spaced apart from one another axially serve for this purpose. Here, the axes of inclination of the tapered rollers are inclined with respect to one another and the outer rings are positioned axially with respect to one another, on corresponding axial stops with respect to one another. In the installed state of the wheel bearing unit, the axial end sides of the inner rings, which end sides point away from one another, are fixed in each case axially on the bearing journal or axially on the lock nut which is screwed onto said bearing journal. The end faces which face one another are positioned axially by means of a sleeve which is arranged between them.

In the non-installed state, the inner rings and the roller crown rings are captively secured and positionally fixed to a limited extent. In particular, as a result of a partly great axial play, the sleeve is not held between the inner rings and can therefore be displaced radially and therefore make mounting of the wheel bearing unit on the bearing journal more difficult.

BRIEF SUMMARY OF THE INVENTION

An object of the invention is to develop a radial bearing unit of simple production and mounting on the bearing journal.

The object is achieved by a wheel bearing unit, in particular for commercial vehicles, having a wheel hub which is mounted rotatably on a bearing journal by means of two tapered roller bearings which are spaced apart from one another axially with in each case one outer ring, one inner ring and one roller crown ring which is arranged between the former and is formed from tapered rollers and a bearing cage for them, the tapered roller bearings being received by means of their outer rings on in each case one axial stop of the wheel hub such that they are directed counter to one another, the inner rings of the tapered roller bearings being spaced apart axially from one another by means of a sleeve, the wheel hub, tapered roller bearings and sleeve forming a self-retaining assembly in the non-installed state of the wheel bearing unit, and both tapered roller bearings being secured axially by means of in each case one securing means which is received directly on the wheel hub and covers the roller crown ring radially at least partially.

A simple self-retaining action of the tapered roller bearings and of the sleeve can be achieved during the time up to mounting of the assembly by way of two securing means which are arranged in each case on those sides of the tapered roller bearings which face away from one another. To this end, in particular, a play between the roller crown ring or the inner rings of the tapered roller bearings and the securing means is kept small, in order to limit the axial displacement thereof in the non-installed state. Contact or even a prestress of the securing means with respect to the roller crown ring or the inner ring is avoided at least in the installed state of the wheel bearing unit, in order to avoid frictional wear between components of the tapered roller bearing and the securing means which are loaded with a differential rotational speed. It can be provided here to clamp the securing means with respect to the roller crown ring or the inner ring in the non-installed state and to form a play between the securing means and the tapered roller bearing during mounting. To this end, for example, a securing means can be provided which is configured as a disk spring, is clamped axially between the axial stop and the inner ring or roller crown ring, and the prestress of which is canceled by means of a nut which is screwed onto the bearing journal in order to secure the wheel bearing unit, by it clamping between inner ring and nut and lifting up from the axial stop.

In one embodiment, at least one of the two securing means can be formed from a securing ring which is arranged in a radial groove of the wheel hub. Here, the securing ring can be stretched radially to the inside to such an extent that it engages radially over the roller crown ring and forms an axial stop for the inner ring. Here, the securing ring is provided with a small amount of play with respect to the inner ring, in order to avoid friction in the installed state.

As an alternative to a self-retaining action of the inner ring by way of the securing ring, the latter can form an axial stop for the roller crown ring, the inner ring being secured axially in the direction of the securing ring with respect to the roller crown ring by means of an annular rim. Here, the bearing cage of the roller crown ring is positionally secured axially, it also being possible here for a minimum play of the securing ring with respect to the bearing cage to be maintained.

In another embodiment, the securing ring is configured as a wave ring with a wave profile which is formed over the circumference. The wave ring can have an outer and inner profile formed in the circumferential direction, the outer profile engaging into the radial groove and the roller crown ring being secured axially by means of the inner profile thereof.

As an alternative or in addition, at least one of the tapered roller bearings can be fixed positionally by means of a securing ring which is of substantially U-shaped configuration with two limbs which are connected by means of a clip. Here, the free ends thereof of the limbs and corners between limb and clip engage radially into the radial groove, the roller crown ring being axially secured and positionally fixed by means of the limbs in the non-installed state of the wheel bearing unit. In order to increase the bearing area of the securing ring with respect to the roller crown ring, the bearing cage of the roller crown ring, a washer which is recessed in a substantially U-shaped manner can be arranged between the securing ring and the tapered roller bearing. By way of the cutout in the washer, the nut, as central nut, which is screwed onto the bearing journal for axial fixing of the wheel bearing unit can be clamped with the inner ring of the outer tapered roller bearing without removal of the washer.

As an alternative to a securing ring for the self-retaining action of the tapered roller bearings, on at least one side which faces a tapered roller bearing, the securing means can be formed from a seal which is arranged between the wheel hub and the inner ring and forms an axial stop for the roller crown ring, and the inner ring can be secured axially in the direction of the securing ring with respect to the roller crown ring by means of an annular rim.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
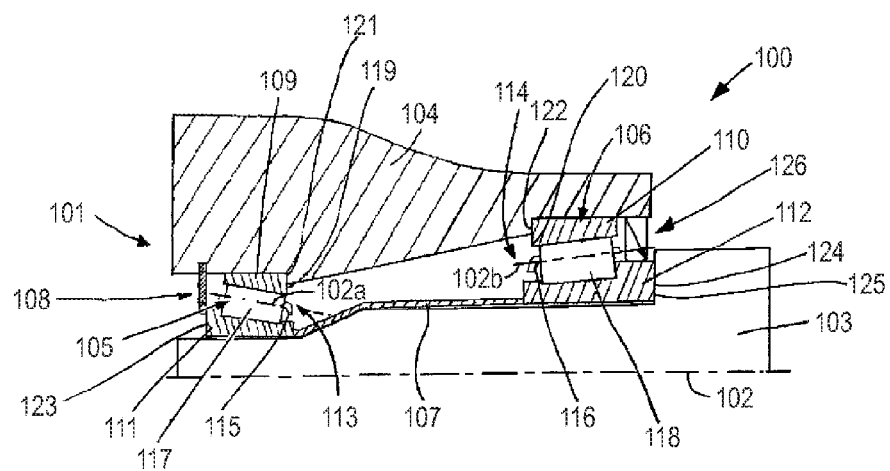
FIG. 1 is a partial section through a wheel bearing unit of the invention with two different securing means for each tapered roller bearing.

FIG. 1 shows wheel bearing unit 100 in a diagrammatic illustration in partial section. The upper part of wheel bearing unit 100 is arranged around rotational axis 102. In the state in which it is removed from bearing journal 103, wheel bearing unit 100 forms assembly 101 which is formed from wheel hub 104 which receives a wheel, two tapered roller bearings 105, 106 which are spaced apart axially and are spaced apart axially from one another on different diameters on wheel hub 104, and sleeve 107 which is arranged between tapered roller bearings 105, 106.

Tapered roller bearings 105, 106 in each case have outer ring 109, 110 which is received on wheel hub 104, inner ring 111, 112 which is provided for receiving wheel bearing unit 100 on bearing journal 103, and roller crown rings 113, 114 comprising tapered rollers 117, 118 which are received in bearing cage 115, 116 such that they are distributed over the circumference.

Rotational axes 102a, 102b of tapered rollers 117, 118 are in each case inclined with respect to rotational axis 102 so as to face one another, with the result that wheel hub 104 is mounted radially and axially with respect to bearing journal 103. Tapered roller bearings 105, 106 are placed on axial stops 121, 122 by means of outer rings 109, 110 on their end sides 119, 120 which lie opposite one another.

In the installed state of assembly 101, end sides 123, 124, lying opposite one another, of inner rings 111, 112 are clamped on one side by means of a central nut (not shown) which is screwed onto the end side of bearing journal 103 and on the other side by means of axial stop 125, sleeve 107 spacing inner rings 111, 112 apart.

In the removed state of assembly 101, inner rings 111, 112 are not prestressed axially against one another, with the result that they are not of captive configuration per se as a consequence of inclined rotational axes 102a, 102b of tapered rollers 117, 118. In order to produce the positional fixing of inner rings 111, 112 and therefore of roller crown rings 113, 114 in the removed state of radial bearing unit 100 in the form of assembly 101, in each case one axial securing means 108, 126 which in each case positionally fixes inner ring 111, 112 axially is provided on the outer sides of wheel bearing unit 100. Securing means 108, 126 are shown in detail individually in the following figures.

Figure 2:
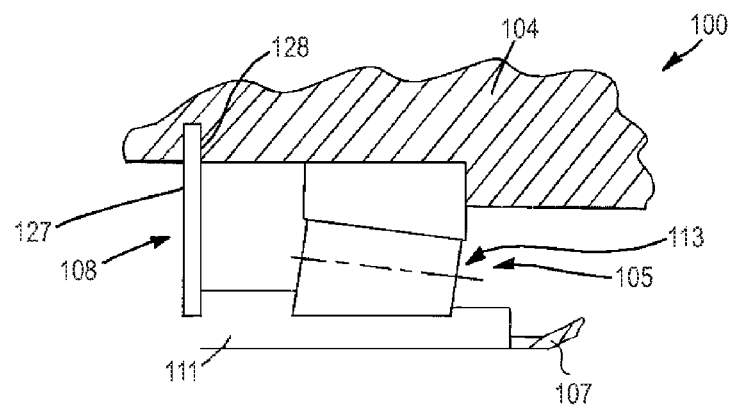
FIG. 2 is a tapered roller bearing in partial section with a securing ring which engages completely over the roller crown ring radially in accordance with FIG. 1.

FIG. 2 shows a detail of wheel bearing unit 100 of FIG. 1 with tapered roller bearing 105. Here, securing means 108 is configured as securing ring 127 which is fitted into radial groove 128 of wheel hub 104 and engages radially over roller crown ring 113 and loads inner ring 111 axially. Here, a contact with inner ring 111 can be produced, which contact limits the axial play of inner ring 111 in such a way that sleeve 107 remains centered between inner rings 111 and 112 (FIG. 1). Here, friction of securing ring 127 with respect to inner ring 111 is kept low, in order, in the installed state, to avoid wear and frictional moments between securing ring 127 which rotates with wheel hub 104 and fixed inner ring 111. As an alternative, a small axial gap can be provided between securing ring 127 and inner ring 111.

Figure 3:
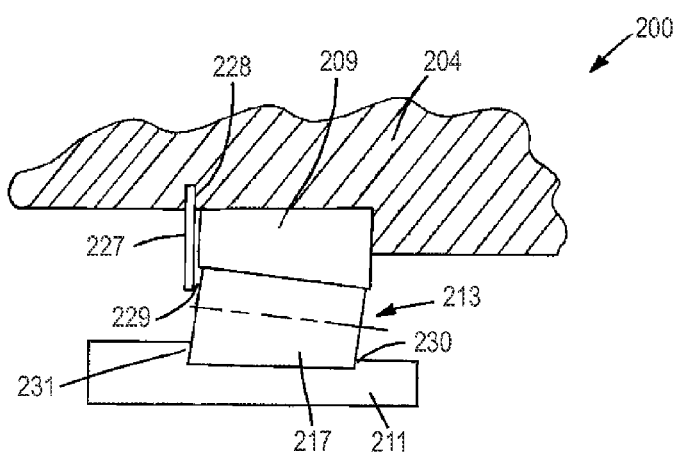
FIG. 3 is a partial section of a tapered roller bearing with a securing ring which is modified with respect to FIG. 2 and engages over the roller crown ring partially.

FIG. 3 shows a variant of securing ring 127 which is shown in FIG. 2, in the form of securing ring 227 of radial bearing unit 200, which securing ring 227 is received in radial groove 228 which is made in wheel hub 204 at a small spacing from outer ring 209. Securing ring 227 engages over roller crown ring 213 partially radially and secures it against axial displacement. Here, axial gap 229 is formed in order to prevent friction and wear between roller crown ring 213 and securing ring 227. As a consequence of annular rims 230, 231 which are provided on inner ring 211, inner ring 211 is mounted substantially without axial play with respect to tapered rollers 217, with the result that the inner ring is prevented by annular rim 231 from being deflected axially in the case of axially fixed roller crown ring 213. The axial fixing of roller crown ring 213 by way of securing ring 227 can be effected at tapered rollers 217 or at the bearing cage (not shown).

Figure 4:
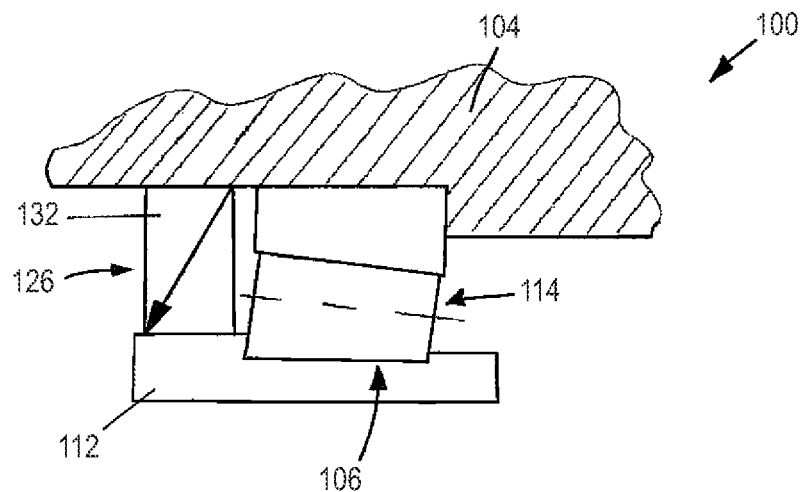
FIG. 4 is a partial section through a tapered roller bearing with a securing means which is configured as a seal and is arranged between the wheel hub and inner ring.

FIG. 4 shows a detail of wheel bearing unit 100 with tapered roller bearing 106 which faces away from the free end of the bearing journal and axial securing means 126 of which is configured as seal 132. Seal 132 is introduced between wheel hub 104 and inner ring 112 and, by way of its friction, prevents an axial displacement of the inner ring with respect to wheel hub 104, as a result of which it positionally fixes inner ring 112 and also roller crown ring 114 in the removed state of wheel bearing unit 100.

Figure 5:
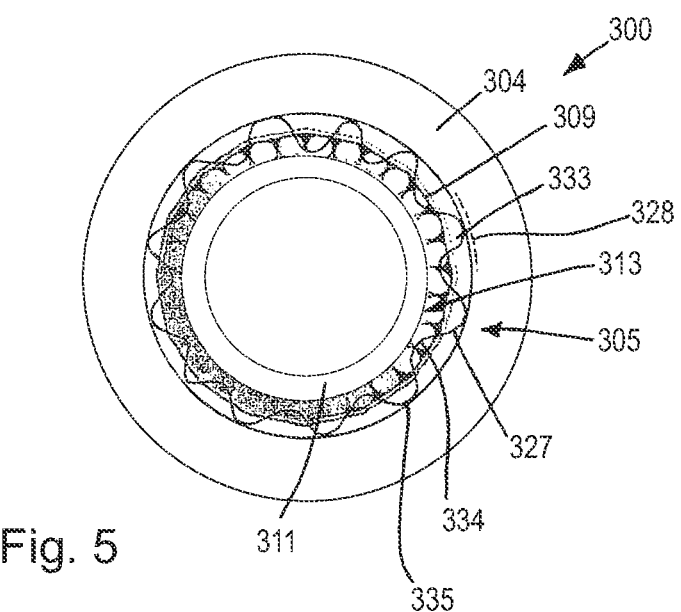
FIG. 5 is a plan view of a tapered roller bearing with a securing means which is configured as a wave ring.

FIG. 5 shows wheel bearing unit 300 with wheel hub 304 and tapered roller bearing 305 with inner ring 311 and roller crown ring 313, which tapered roller bearing 305 is received by means of outer ring 309 on wheel hub 304. The axial positional securing of inner ring 311 and of roller crown ring 313 is effected by means of securing ring 327 which is provided in this embodiment as wave ring 333 with a wave profile which is configured in the form of radially inwardly and outwardly displaced waves 334, 335. Here, waves 335 engage in each case into radial groove 328 which is provided so as to be circumferential, whereas radially inwardly directed waves 334 axially position roller crown ring 313 and therefore, inner ring 311 axially, since inner ring 311, in accordance with inner ring 211 of FIG. 3, has an annular rim (not shown) which corresponds to annular rim 230.

Figures 6, 7:
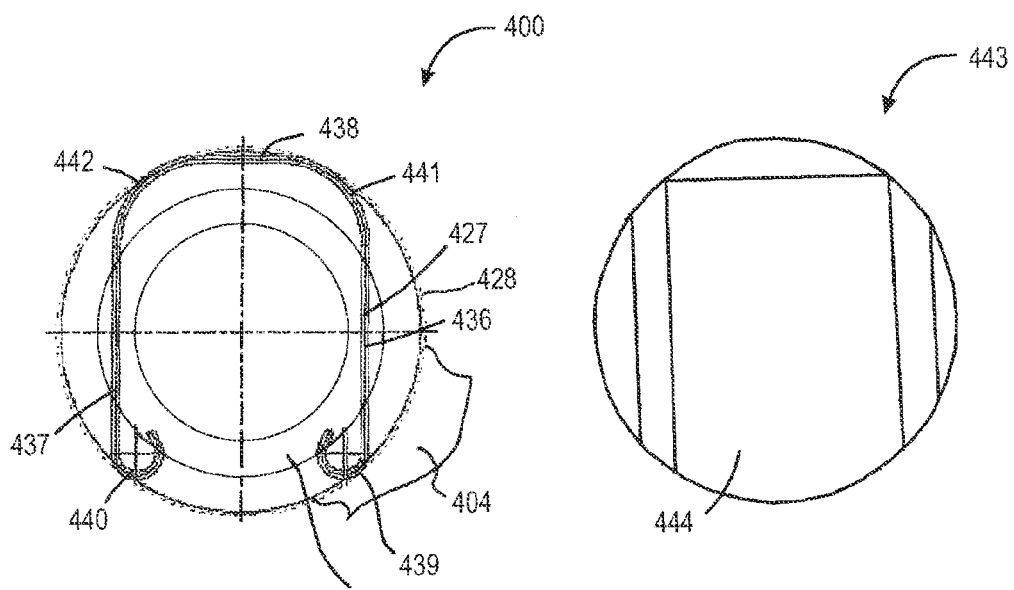
FIG. 6 is a plan view of a tapered roller bearing with a securing ring of U-shaped configuration.
FIG. 7 is a diagrammatic view of a washer for the securing ring of FIG. 6.

FIG. 6 shows a further alternative of wheel bearing unit 400 with securing ring 427 which is configured to be open on one side and U-shaped. Here, two limbs 436, 437 are connected by means of clip 438, free ends 439, 440 which are rolled up here and corners 441, 442 being latched into radial groove 428 of wheel hub 404. The middle regions of limbs 436, 437 sweep over inner ring 411 and form the positional securing for the latter.

With reference to FIG. 6, FIG. 7 diagrammatically shows washer 443 with cutout 444, as a result of which the contour of washer 443 is adapted to securing ring 427. Washer 443 can be arranged between securing ring 427 and inner ring 411 and, as a consequence of cutout 444, permits access of the central nut for loading inner ring 411 during the mounting of the radial bearing unit on the bearing journal.

Figure 8:
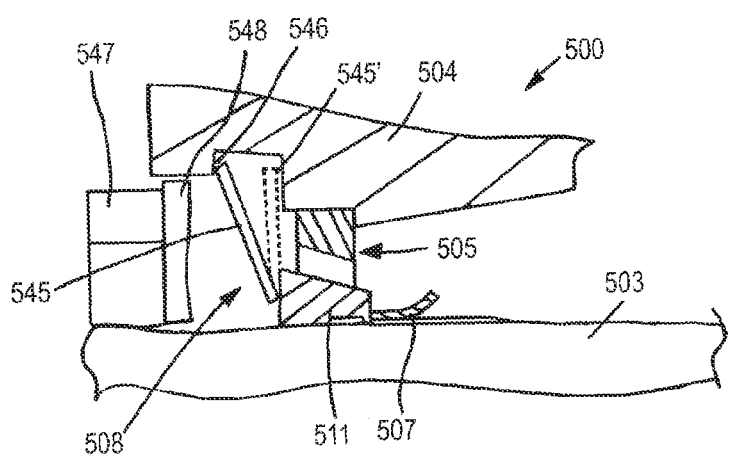
FIG. 8 is a partial section through a tapered roller bearing with a securing means which is configured as a spring element and is clamped axially between the wheel hub and the inner ring.

FIG. 8 shows a partial section of wheel bearing unit 500 with tapered roller bearing 505. In the embodiment shown, securing means 508 is configured as spring element 545, for example, as a disk spring, which is clamped axially between inner ring 511 and axial stop 546 of wheel hub 504, with the result that, in the non-installed state of wheel bearing unit 500, inner ring 511 is positionally fixed and is clamped axially with respect to sleeve 507, with the result that, in the non-installed state, sleeve 507 remains centered between the two inner rings. During mounting of wheel bearing unit 500 on bearing journal 503, central nut 547 is screwed onto the bearing journal and therefore, as the dashed illustration of spring element 545' shows, spring element 545 is lifted up from axial stop 546, with the result that, in the installed state of wheel bearing unit 500, the prestress of spring element 545 with respect to inner ring 511 and its contact with the latter are canceled. Additional washer 548 can be provided between central nut 547 and the spring element.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE NUMBERS

100 Wheel bearing unit
101 Assembly
102 Rotational axis
102a Rotational axis
102b Rotational axis
103 Bearing journal
104 Wheel hub
105 Tapered roller bearing
106 Tapered roller bearing
107 Sleeve
108 Securing means
109 Outer ring
110 Outer ring
111 Inner ring
112 Inner ring
113 Roller crown ring
114 Roller crown ring
115 Bearing cage
116 Bearing cage
117 Tapered roller
118 Tapered roller
119 End side
120 End side
121 Axial stop
122 Axial stop
123 End side
124 End side
125 Axial stop
126 Securing means
127 Securing ring
128 Radial groove
132 Seal
200 Wheel bearing unit
204 Wheel hub
209 Outer ring
211 Inner ring
213 Roller crown ring
217 Tapered roller
227 Securing ring
228 Radial groove
229 Axial gap
230 Annular rim
231 Annular rim
300 Wheel bearing unit
304 Wheel hub
305 Tapered roller bearing
309 Outer ring
311 Inner ring
313 Roller crown ring
327 Securing ring
328 Radial groove
333 Wave ring
334 Wave
335 Wave
400 Wheel bearing unit
404 Wheel hub
411 Inner ring
427 Securing ring
428 Radial groove
436 Limb
437 Limb 438 Clip
439 Free end
440 Free end
441 Corner
442 Corner
443 Washer
444 Cutout
500 Wheel bearing unit
503 Bearing journal
504 Wheel hub
505 Tapered roller bearing
507 Sleeve
508 Securing means
511 Inner ring
545 Spring element
545' Spring element
546 Axial stop
547 Central nut
548 Washer

The invention claimed is:

1. A wheel bearing unit for commercial vehicles, comprising:
  a bearing journal;
  a wheel hub mounted rotatably on said bearing journal by means of two tapered roller bearings which are spaced apart from one another axially, each tapered roller bearing having:
    an outer ring;
    an inner ring; and,
    a roller crown ring arranged between said outer ring and said inner ring and formed from tapered rollers and a bearing cage for said tapered rollers;
  axial stops of said wheel hub arranged in series between said outer rings of said tapered roller bearings such that said tapered roller bearings are directed counter to one another; and,
  a sleeve arranged between said inner rings of said tapered roller bearings such that said inner rings are spaced apart axially from one another;
  wherein said wheel hub, said tapered roller bearings and said sleeve form a self-retaining assembly in a non-installed state of the wheel bearing unit;
  wherein said self-retaining assembly comprises a securing ring arranged in a radial groove of said wheel hub for securing each tapered roller bearing axially, said securing ring received directly on said wheel hub and covering said roller crown ring radially at least partially;
  wherein said securing ring forms an axial stop for said roller crown ring and said inner ring is secured axially in a direction of said securing ring with respect to said roller crown ring by means of an annular rim; and,
  wherein said securing ring is a wave ring with a wave profile which is formed over a circumference and a radially outer wave of which engages into said radial groove, and said roller crown ring is secured axially by means of radially inner waves.

2. The wheel bearing unit as recited in claim 1, wherein said securing ring forms an axial stop for said inner ring.

3. The wheel bearing unit as recited in claim 1, wherein said securing ring is of substantially U-shaped configuration with two limbs which are connected by means of a clip, free ends of said limbs and corners between said limbs and clip being received in said radial groove, and said roller crown ring or said inner ring being secured axially by means of said limbs.

4. The wheel bearing unit as recited in claim 1, wherein a washer which is recessed in a substantially U-shaped manner is arranged between said securing ring and said tapered roller bearing.

5. A wheel bearing unit for commercial vehicles, comprising:
  a bearing journal;
  a wheel hub mounted rotatably on said bearing journal by means of two tapered roller bearings which are spaced apart from one another axially, each tapered roller bearing having:
    an outer ring;
    an inner ring; and,
    a roller crown ring arranged between said outer ring and said inner ring and formed from tapered rollers and a bearing cage for said tapered rollers;
  axial stops of said wheel hub arranged in series between said outer rings of said tapered roller bearings such that said tapered roller bearings are directed counter to one another; and,
  a sleeve arranged between said inner rings of said tapered roller bearings such that said inner rings are spaced apart axially from one another;
  wherein said wheel hub, said tapered roller bearings and said sleeve form a self-retaining assembly in a non-installed state of said wheel bearing unit; and,
  wherein said self-retaining assembly comprises a spring element for securing each tapered roller bearing, said spring element prestressed axially between said wheel hub and said roller crown ring or said inner ring and the prestress of which is canceled during the mounting of said wheel bearing unit on said bearing journal.

* * * * *